United States Patent
Mordente et al.

(10) Patent No.: US 10,963,765 B2
(45) Date of Patent: Mar. 30, 2021

(54) STUDYING AND GAMING INTERACTIVE SURFACES WITH THE IDENTIFICATION OF OBJECTS USING RFID

(71) Applicant: Wavedu S.r.l., Salerno (IT)

(72) Inventors: Stefano Mordente, Salerno (IT); Francesco Mordente, Salerno (IT)

(73) Assignee: WAVEDU S.R.L., Salerno (IT)

( * ) Notice: Subject to any disclaimer, the term of this patent is extended or adjusted under 35 U.S.C. 154(b) by 0 days.

(21) Appl. No.: 16/478,669

(22) PCT Filed: Jan. 17, 2018

(86) PCT No.: PCT/IT2018/050006
§ 371 (c)(1),
(2) Date: Jul. 17, 2019

(87) PCT Pub. No.: WO2018/134858
PCT Pub. Date: Jul. 26, 2018

(65) Prior Publication Data
US 2019/0370621 A1 Dec. 5, 2019

(30) Foreign Application Priority Data
Jan. 18, 2017 (IT) .................. 102017000005258

(51) Int. Cl.
*G06K 19/07* (2006.01)
*G06K 19/077* (2006.01)
(Continued)

(52) U.S. Cl.
CPC ... *G06K 19/0701* (2013.01); *G06K 19/07773* (2013.01); *H01Q 21/0025* (2013.01);
(Continued)

(58) Field of Classification Search
CPC ......... G06K 19/0701; G06K 19/07773; H01Q 21/0025; H01Q 1/2216; H01Q 1/523;
(Continued)

(56) References Cited

U.S. PATENT DOCUMENTS

| 4,777,490 A | 10/1988 | Sharma et al. |
| 6,037,905 A | 3/2000 | Koscica et al. |

(Continued)

FOREIGN PATENT DOCUMENTS

| ES | 2 258 397 A1 | 8/2006 |
| JP | 2011130973 A * | 7/2011 |

OTHER PUBLICATIONS

"Low Cost HF RFID Multiplexer Examples", Texas Instruments, Application Report 11-06-26-015—SLOA144—Oct. 2009.
(Continued)

*Primary Examiner* — Seung H Lee
(74) *Attorney, Agent, or Firm* — MH2 Technology Law Group, LLP

(57) ABSTRACT

Electronic combinable modular system based on a plurality of multidimensional geometric forms, to locate the position of a plurality of Transponder RFID in a multidimensional space and to read and write the informations included. The system includes: a plurality of combinable modular local units, a plurality of combinable modular subsystems, at least a microcontroller and at least an irradiating antenna, connected to the modular subsystems, to put any individual modular local unit in communication with at least a reader/writer Receiver of Transponder RFID. The innovation of the finding allows significant improvements and cost-effectiveness in the construction of arrays or series of antennas as well as new operating modes in recreational, educational and communication fields. The innovation is significant as it
(Continued)

facilitates the interaction even to children not yet schooled and to disabled people of any age.

4 Claims, 8 Drawing Sheets

(51) Int. Cl.
  *H01Q 21/00* (2006.01)
  *H04B 5/00* (2006.01)
  *H01Q 1/22* (2006.01)
  *H01Q 1/52* (2006.01)

(52) U.S. Cl.
  CPC ......... *H04B 5/0062* (2013.01); *H01Q 1/2216* (2013.01); *H01Q 1/523* (2013.01)

(58) Field of Classification Search
  CPC .. H04B 5/0062; H04B 5/0075; H04B 5/0031; A63F 2003/00662; A63F 2009/2489; A63F 3/02
  See application file for complete search history.

(56) References Cited

U.S. PATENT DOCUMENTS

| | | | |
|---|---|---|---|
| 8,974,295 B2* | 3/2015 | Maharbiz | A63F 13/30 463/30 |
| 9,555,320 B2* | 1/2017 | Ellsworth | G01S 5/16 |
| 10,307,661 B2* | 6/2019 | Dandamudi | A63F 13/214 |
| 2006/0246403 A1* | 11/2006 | Monpouet | G06F 3/046 434/128 |
| 2008/0068173 A1 | 3/2008 | Alexis et al. | |
| 2011/0309970 A1* | 12/2011 | Fontijn | H01Q 1/2216 342/146 |

OTHER PUBLICATIONS

"TRF7960A RFID Multiplexer Example System", Texas Instruments, Application Report—SLOA167—May 2012.

Baelzer, Thomas (EP Authorized Officer), International Search Report and Written Opinion of the International Searching Authority, dated Apr. 24, 2018, in corresponding International Application No. PCT/IT2018/050006, 12 pages.

* cited by examiner

STUDYING AND GAMING INTERACTIVE SURFACES WITH THE IDENTIFICATION OF OBJECTS USING RFID

CROSS-REFERENCE TO RELATED APPLICATION(S)

This application is a national stage entry from International Application No. PCT/IT2018/050006, filed on Jan. 17, 2018, in the Receiving Office ("RO/IT") of the Italian Patent and Trademark Office ("IPTO"), and published as International Publication No. WO 2018/134858 A1 on Jul. 26, 2018; International Application No. PCT/IT2018/050006 claims priority from Italian Patent Application No. 102017000005258, filed on Jan. 18, 2017, in the IPTO, the entire contents of all of which are incorporated herein by reference.

APPLICATION

The finding innovates the construction of books, ebook, display, interactive surfaces and it enhances its use in games and surfaces in general, extending the possibilities of use in educational and rehabilitative field, in commercial, industrial, recreational, museum fields, giving the possibility to integrate the interactive surface in a multimedia intervention.

STATE OF THE ART

There are numerous attempts and solutions to build series of antennas connected to Transponder RFID, Radio Frequency IDentication, or to Transponder NFC, Near Field Communication, to recognize and locate objects placed on a level or in a space using electromechanical switches or Transistors or electronic switches to connect the individual antennas as in the Application Report "SLOA144—October 2009" of Texas Instruments which reports applications up to eight antennas.

[LITERATURE:] Another example is given by the TRF7960A RFID Multiplexer Example System of Texas Instruments which for the multiplex of only 16 antennas states, on pag.3 in the Application Report "SLOA167.pdf—may 2012", to use in addition to the control logic, two integrated circuits every four antennas. " . . . . The RFID antenna board main components consist of four PCB trace loop antennas (tuned for 13.56 MHz, Q<20), one Peregrine Semiconductor PE42440 SP4T RF switch, and one Peregrine Semiconductor PE4257 SPDT RF switch . . . ".

[PATENTS:] Another interesting example, innovated by the present finding, is contained in the patent U.S. Pat. No. 4,777,490 A, owner name: General Electric Company, of 1986 "Monolithic antenna with integral pin diode tuning" which uses two PIN Diodes and a BIAS current to isolate an antenna or to connect it to a receiver.

Another interesting example used, modified and innovated by the present finding is contained in the patent of 1998 U.S. Pat. No. 6,037,905 expired, owner name: ARMY, UNITED STATES OF AMERICA, which uses PIN diodes to connect microwave antennas.

The known art and the scientific literature therefore make extensive use of the current-controlled Diodes to bring them into the saturation zone to reduce the resistance to the passage of the RF and to this literature the finding makes an innovative use of the semiconductors and in particular of the Diodes, in the switch between antennas belonging to an array of antennas, in order to solve numerous problems generated by the complexity of the electronic circuit when Transistors or electromechanical or electronic switches are used, and for the reduction of spurious emissions in Radiofrequency by conductors and antennas.

EXPOSURE OF THE FINDING: The finding is a system, with internal power supply as in FIG. 1 or with internal or external power supply as in FIG. 2, modular expandable with a plurality of multidimensional geometric forms (1000) as in FIG. 1, built using known technological means for reading and writing data contained in a plurality of objects (1), with Transponder RFID or NFC (10) as in FIG. 5, near or placed on a surface that can be also curved or confined in a certain space, internal or external to the system (1000), characterized by comprising a plurality of combinable innovative modular local units (100.$a1.c1$), . . . , (100.$an.cn$), as in FIG. 1, better explained in the OPERATION section, having antennas not necessarily spiral-shaped and in electrically conductive material, each connected in series to at least one semiconductor for each individual antenna terminal, preferably but not exhaustively SCHOTTKY diodes or PIN diodes. In addition to the diodes, transistors or integrated circuits can be used, even if less effective.

The modular local units (100.$a1.c1$), . . . , (100.$an.cn$), connected to each other in matrix, are connected through modular subsystems (250.$a1$), . . . , (250.$an$) and (260.$c1$), . . . , (260.$cn$) with inductors, semiconductors, diodes and capacitors (better explained in the OPERATION section) preferably to at least one antenna which irradiates the RF outside, as explained in FIG. 1 where two antennas (60) managed by diode switches (50), allow two players to connect alternately to the system (1000).

For example as in FIG. 1, the signal in Radiofrequency (RF) is generated by a Receiver (Reader) RFID (52) connected to an external device (500) or by a Receiver (Reader) RFID contained in a device (600) and is received by an internal antenna (60), or is generated by an internal Receiver (Reader) RFID (51), as in FIG. 2, connected to the internal subsystem of communication (400) and to the switch (50).

The RF signal flows from the terminals (50.1) and (50.2) of the switch (50) through some conductors (BUS) towards any modular local unit (100.$ax.cx$) for x which assumes the values between 1 and n, uniquely identified by the control logic of the microcontroller (300) which receives the location data of the modular local unit. The identified modular local unit is electrically connected leading into the saturation zone—polarizing through BIAS direct current—only the Diodes connected in series to the terminals of the antenna (101.$an.cn$), as in FIG. 3, and thus allowing the same antenna to be traversed by the RF and to wrap it in its magnetic or electromagnetic field the Transponder RFID put on top or near the identified modular local unit.

It is advisable to highlight that the control logic can send BIAS direct current to more modular local units at the same time then connecting them to each other through the BUS, as represented in FIG. 3 and FIG. 4 and that the antenna with diodes in series (60), as represented in FIG. 1 and FIG. 2, is to be considered in addition to the contest of the other local Units only for reasons of descriptive harmony as it could be well represented by any local Unit being identical to them and using the same connection mode to the Bus.

It is also highlighted that the set of the local units, connected to the BUS through the subsystems, constitutes a not hierarchical Polycentric Network of antennas with diodes in series dynamically reconfigurable via software through Bias Direct Current which allows to connect one or more antennas with each other or with a Reader of Tag RFID and also to split out via software rough Bias Current the local units in different groups each one connected to individual independent local units.

The RF with the codes received by the Transponder RFID then come back on the BUS and through the capacitors of the modular subsystems (250.a1), . . . , (250.an) and (260.c1), . . . , (260.cn), as in FIG. 3, is conveyed towards the terminals (50.1) and (50.2) of the switch (50) and then, as in FIG. 1, FIG. 2, towards the Receiver (Reader) RFID (51) or towards a single antenna (60) in turn coupled inductively or electromagnetically to an external device Receiver (Reader) of Transponder RFID contained for example in a smartphone (600) or in a tablet (500).

It is useful to position the connection with the Receiver (Reader) or with the irradiating antenna at the center of the star formed by the branches of the conductors and connect in series on the conductors one or more Diodes which, kept in the zone of interdiction when not crossed by the BIAS current, have the function of dissecting the antennas not powered by the control logic of the microcontroller (300) to reduce the mutual interaction between antennas as well as preventing the conductors from radiating RF, thus allowing a univocal addressing of the RF towards the only antenna traveled by BIAS current.

The replacement of the Diodes, near the antenna, with one or more optical emission diodes (typically LED)—as highlighted in FIG. 3, FIG. 4, FIG. 6 and FIG. 7—allows to report optically to the user the position of the local unit identified an enabled; a proximity sensor (3) as in FIG. 3 report immediately to the control logic of the microcontroller the presence or the removal of an overlying object; a magnet (2), placed as in FIG. 3 preferably in the center of every single antennas, allow to restrict the flow of the magnetic field of the turns and to make the connection with the object above the antenna mechanically more stable; object which is in turn equipped, as well as of a Transponder RFID, of a magnet (4) inserted in the base as in FIG. 5. The dimensions of the single antennas, the number and section of the turns and the values of the capacitors and of the inductors, calculated based on the frequencies used and on the laws of physics and electronics, depend on the design of the circuit, on the Receiver (Reader) used, on the emission powers and on the frequencies RFID admitted by the Authorities. Typically but not exhaustively frequencies of 125 KHz, 134 KHz, 13.56 MHz, 868 MHz, 2.45 GHz are used.

The modularity of the local units and of the subsystems with diodes, inductors and capacitors allows to expand the number of the local units on an single PCB, made with commercial materials, or to compose indefinitely the single elements—local units (100.ax.cx) and subsystems (250.ax) and (260.cx) for x c which assumes the values between 1 and n-, as in FIG. 4, up to the condition of instability of the system mainly due to dispersions of the RF through the conductors. In the case of large surfaces and curved surfaces, it's necessary to shield the conductors. Another way of using these windings is to incorporate them directly in an integrated surface for example to a tablet or with transparent PCB and with conductors extremely thin enough to make them almost invisible so as not to limit the vision of the underlying image.

OPERATION: With reference to the FIG. 1, the management software executed in the computer (500), possibly connected to a remote server, or in the smartphone or tablet (600), send via electricity conductors or via radiofrequency, using the protocols that technology makes available (typically but not exhaustively Usb, Wi-Fi, Bluetooth, Zigbee, Lo-Ra, Thread, Optical), a code on the communication interface (400) which transmits it to the microcontroller (300).

For example, in the connection of the modular local unit (100.an.cn), the microcontroller (300) uses the codes received by the communication system (400) to activate the connection circuit of the single modular local unit (100.an.cn), raises the potential (voltage) of its Pin (an)—in summary Pin (300.an), see in FIG. 8 a non-exhaustive highlight of the Pin of the microcontroller (300)—connected to the subsystem (250.an) and leads to potential 0 its Pin (300.cn) connected to the subsystem (260.cn) in the upper branch of the system (1000).

Therefore, as in FIG. 3, the PD (potential difference), let the direct current (DC) flow (typically but not exhaustively between 10 and 20 mA) in the conductors which connect the Pin (300.an) to the inductor (250.an.b) contained in the subsystem (250.an) crossing and bringing in saturation the Diode (250.an.c). The DC flows on the conductor—crossing any diodes added in series if the conductor is very long-until it finds the Diode (103.an.cn) belonging to the local unit (100.an.cn). Other Diodes belonging to other local units are not crossed by the DC because they are not subjected to the Potential Difference.

The current DC flows in succession—because they are connected in series with each other—the Diode (103.an.cn), the antenna (101.an.cn), the subsequent Diode (104.an.cn) pouring over the conductor and the subsystem (260.cn), saturating the previous Diodes crossed and the Diode in series (260.cn.c), finally crosses the inductor (260.cn.b) to pour on the circuit connected to the Pin (300.cn) which the microcontroller (300) keeps to potential 0.

The Diodes remain saturated until they are crossed by the DC and they oppose a very low resistance to the passage of a possible RF in the antenna (101.an.cn)—which has in parallel the capacitor (102.an.cn) to resonate at the frequency of the RF—and connected in RF on one side to the capacitor (250.an.a) of the subsystem (250.an) and on the other side to the capacitor (260.cn.a) of the subsystem (260.cn) pouring, as in FIG. 1, on the terminals (50.1) and (50.2) of a switch RF (50). If a proximity sensor (3), belonging to a trivial matrix of a microcontroller circuit, recognizes the presence of the tablet or of the smartphone, a signal is sent to the microcontroller (300) which, through the switch (50), connect an antenna to the circuit (60), if not it connects, if present, at least a Receiver reader/writer RFID (51) as in FIG. 2.

The entry RF coming from the in Receiver reader/writer RFID (51) or from the outside through an antenna (60), as in FIG. 2, from the point (50.1) passes through, see FIG. 3, the capacitor (250.an.a) but, being locked towards mass by the inductor (Radio Frequency Choke) (250.an.b) it is therefore forced to cross the Diode (250.an.c), any other Diodes in series, the Diode (103.an.cn)—kept in saturation zone by the DC—and the same antenna (101.an.cn) which can therefore generate an inductive or electromagnetic field. The RF then passes through the Diode (104.an.cn) that like the other diodes is still in the saturation zone, passes through the conductor and crosses the Diode (260.cn.c) and not being able to cross the inductor towards mass (Radio Frequency Choke) (260.cn.b) passes through the capacitor (260.cn.a) and pours onto the terminal (50.2) of the switch RF (50) of FIG. 2 and then on the selected Receiver (Reader) (51) or antenna (60).

The electric signals in Radiofrequency which passes through the antenna (101.an.cn) place in an inductive or electromagnetic connection, based on the frequency of the Reader, a possible TAG (10) contained into the object (1) of FIG. 5—placed nearby the antenna—and having usual forms such as (10.1) or (10.2) or other forms; the TAG is activated and the data contained are received from the same antenna (101.*an.cn*) and are sent together with the RF to the terminals (50.1) and (50.2) and then to the tablet or smartphone through the antenna (60) or sent to the Receiver (Reader) reader/writer of Transponder RFID (51) resident in the system. The data decoded by the Receiver (Reader) RFID (51) are sent through the communication interface (400)—wired, optical or on radiofrequency—as in FIG. 2 to the computer (500) or also to the tablet or smartphone connected to the antenna (60) which process the information received.

It can also be used the application of the BIAS current separate for each single modular local unit as for example in the modular local unit (110.*an.cn*) of FIG. 6 or for every single modular local unit (120.*an.cn*) as in FIG. 7, in which it is highlighted the n-th local unit with the Diodes placed in anti-series on the terminals of the antenna.

It is useful to memorize, with well-known means, the acquired data and the relative spatial and temporal references in order to transmit them in a deferred way.

It is useful also the association of the system (1000) as in FIG. 1 to a plurality of systems of similar type to allow the realization of a systems network, geographically distributed and operating in real time within a geographical area that is dynamically explored by at least one remote processing station, configured with well-known means to communicate with said systems by receiving and transmitting, even in real time, the data to each of said systems.

This configuration of the systems network also allows local supervision, of the games and study proposals, by caregivers, parents and professionals.

BENEFITS

Figure 1:
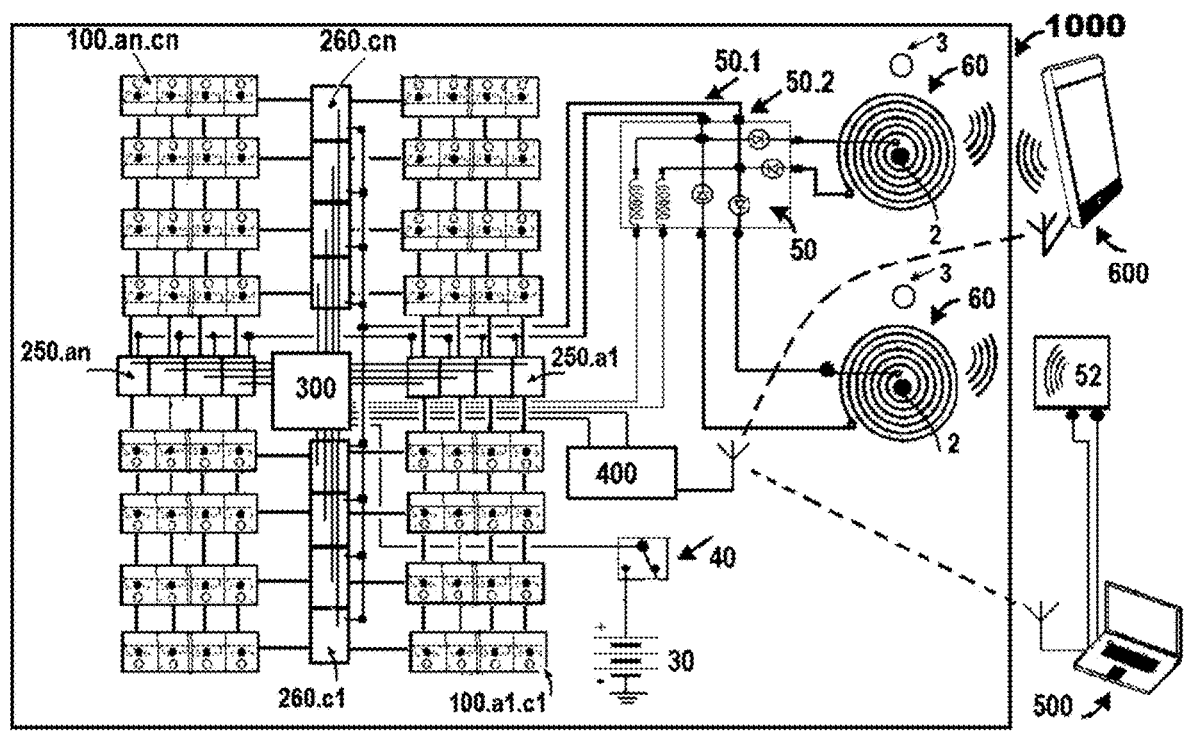
FIG. 1—It shows an example of application of the finding
Figure 2:
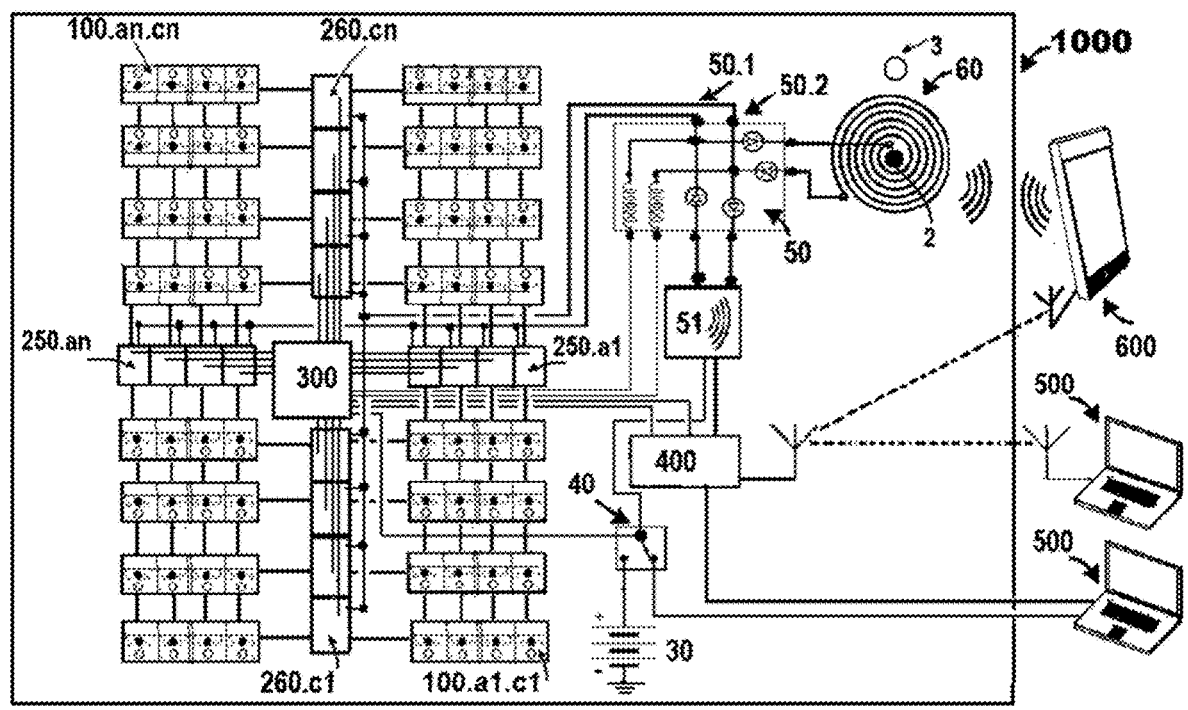
FIG. 2—It reports a further example of application of the finding
Figure 3:
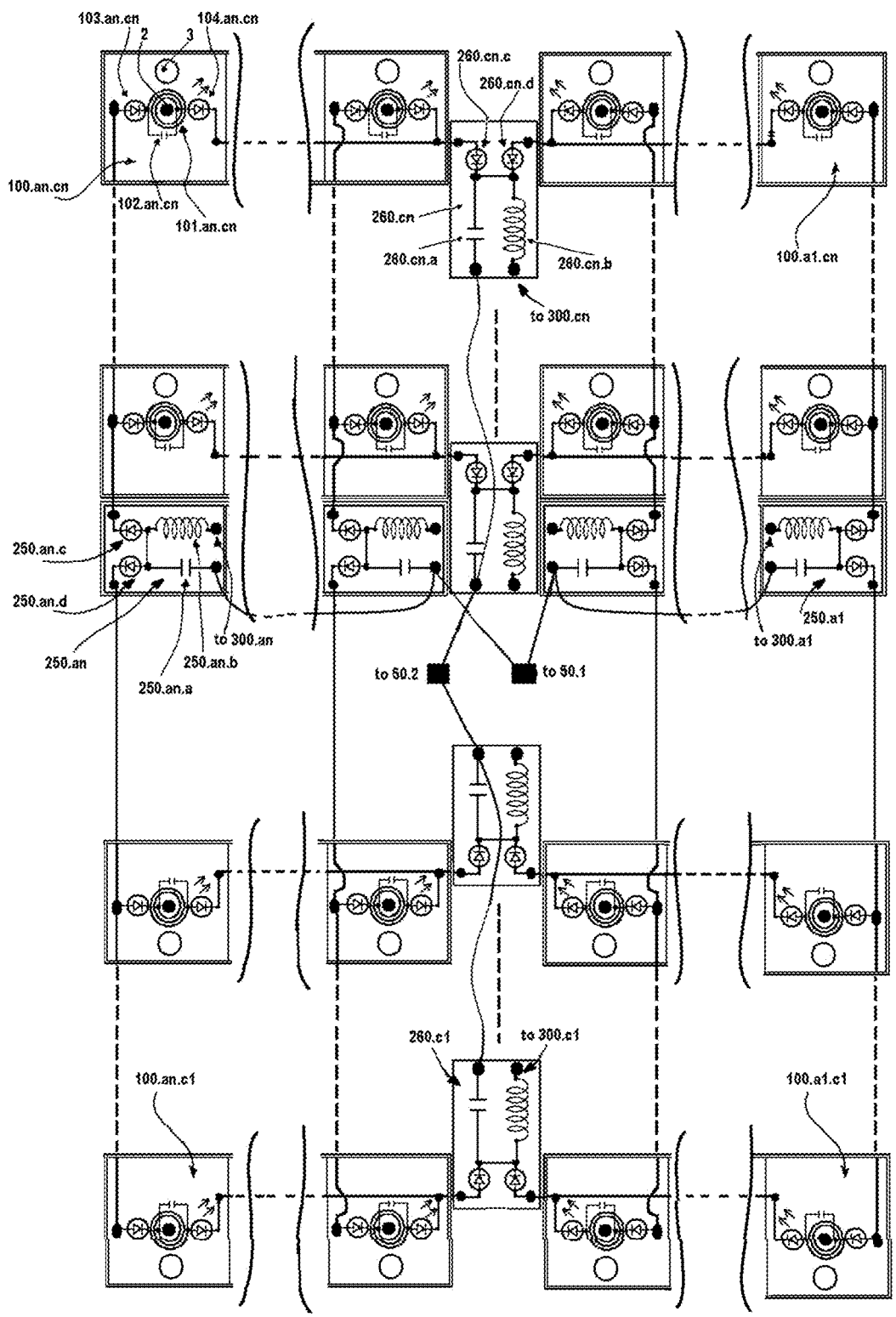
FIG. 3—It reports the structure in matrix of the local Units with direct current power supply FIG. 4—It reports the re-statement of the structure in a modular format FIG. 5—It reports an example of object with Tag RFID and examples of Tag RFID FIG. 6—It reports an example of direct current power supply of individual local units with diodes in anti-series FIG. 7—It reports an example of direct current power supply of individual local units with diodes in anti-series FIG. 8—It reports an example of microcontroller with inputs and outputs for direct current
Figure 4:
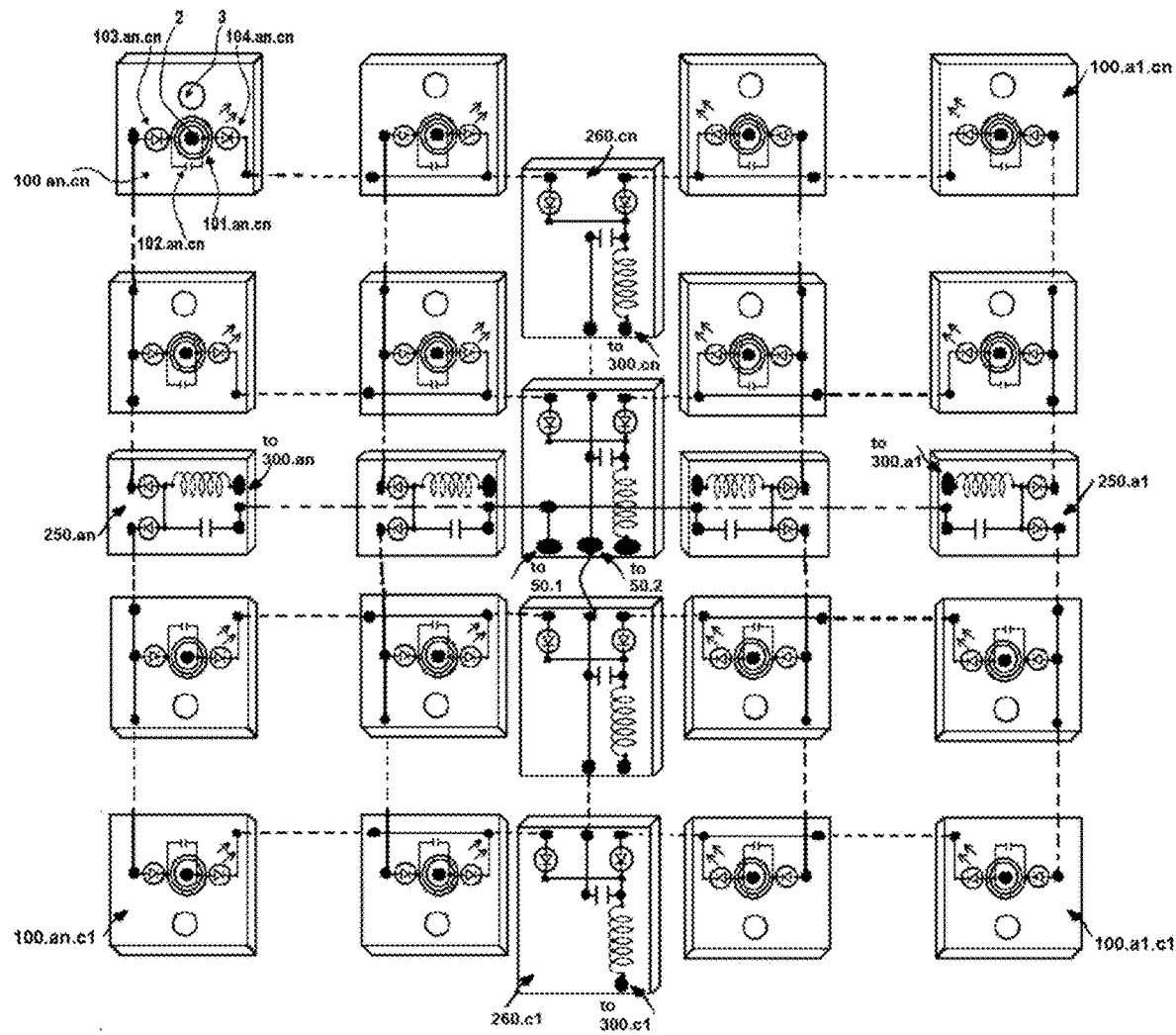
Figure 5:
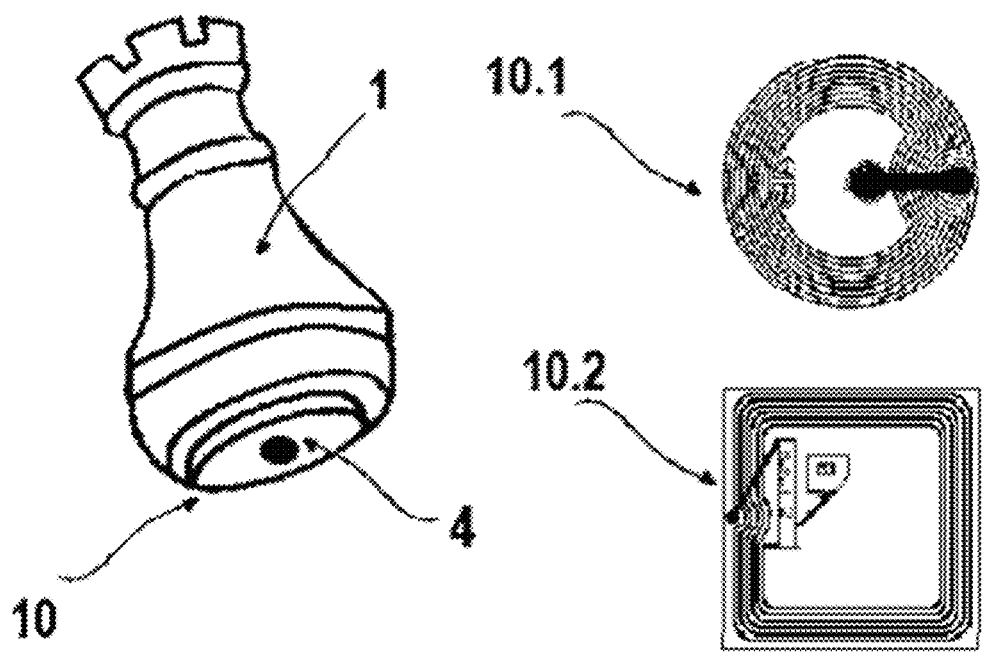
Figure 6:
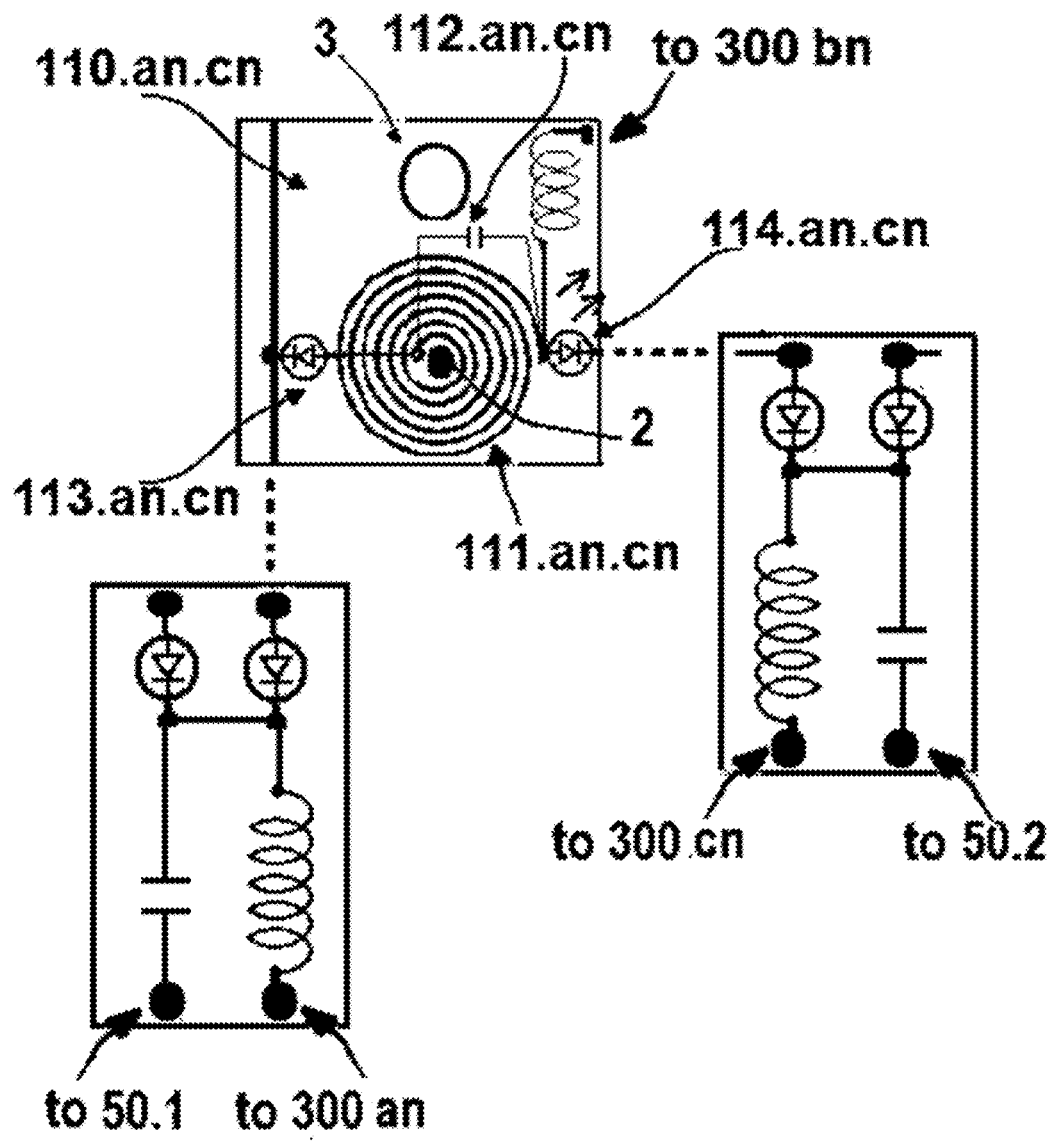
Figure 7:
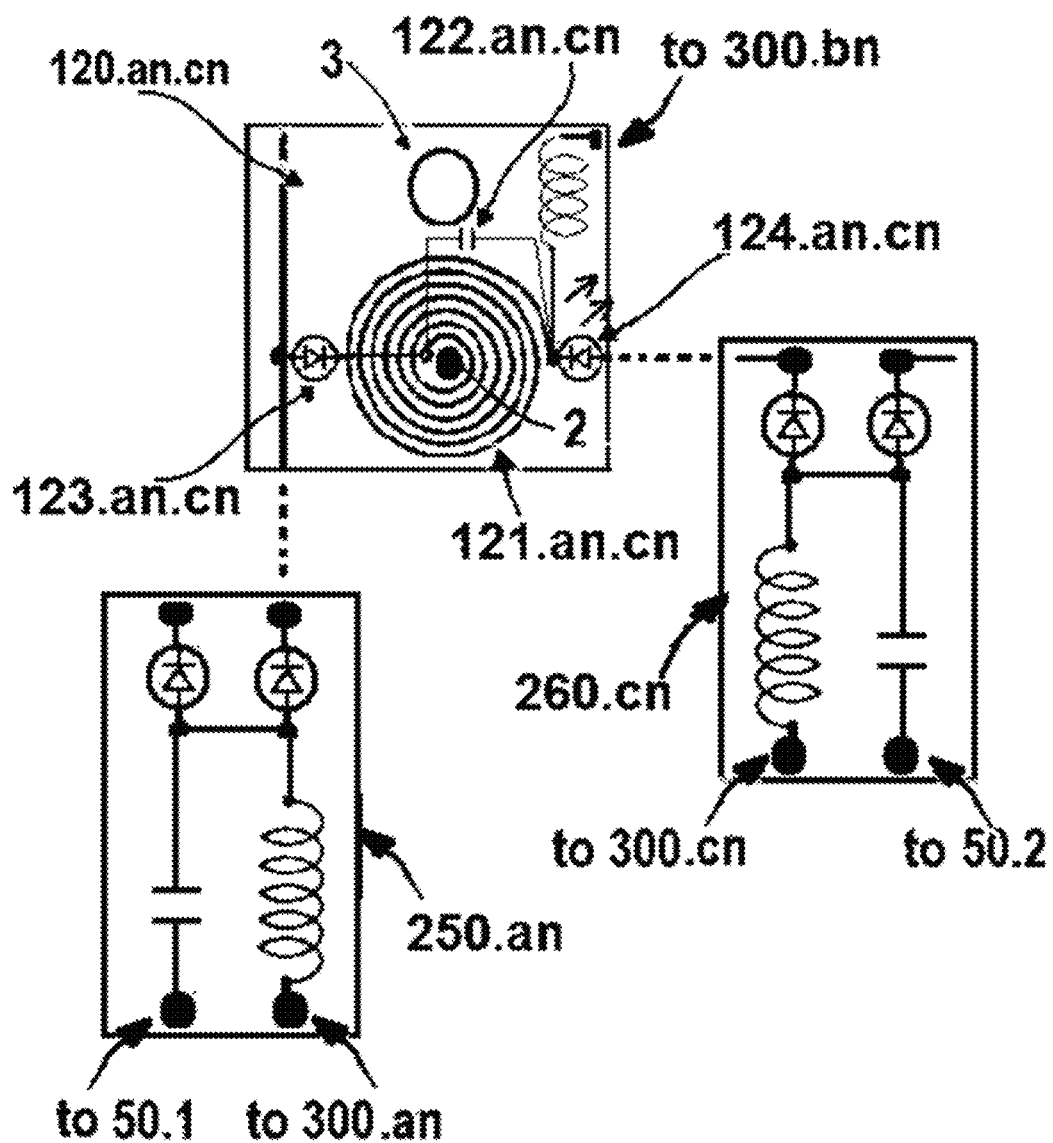
Figure 8:
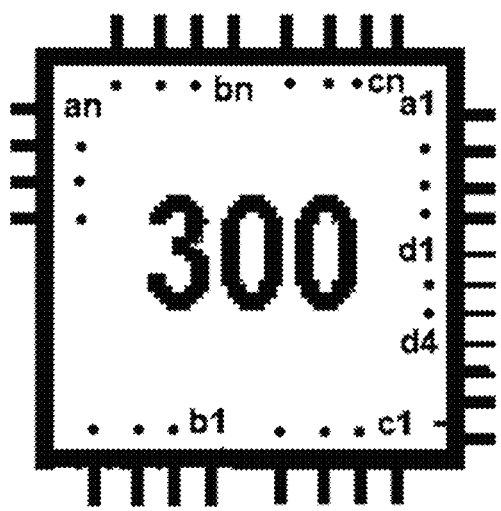

The innovation of the finding allows a significant improvement and cost-effectiveness in the construction of matrices or series of modular antennas with plurality of multidimensional geometric forms as well as new operating modes in recreational, educational-scholastic and communication fields. The innovation is significant as it facilitates the interaction even to children not yet schooled and to disabled people of any age.

The invention claimed is:

1. An electronic combinable modular system based on a plurality of multidimensional geometric forms, to locate positions of a plurality of Transponder radio-frequency identification (RFID) in a multidimensional space, and to read and write information included, the system comprising:
a plurality of combinable modular local units with first capacitors and antennas, and made of electrically conductive material connected in series to a plurality of first diodes for each terminal of the antennas in order to allow passage of direct current eventually applied;
a plurality of combinable modular subsystems with inductors, second diodes, and second capacitors connected to the combinable modular local units and to at least one microcontroller to supply power through bias direct current to any of the combinable modular local units;
at least one irradiating antenna internal to the system, connected in series to a plurality of third diodes for each terminal of the at least one irradiating antenna, connected to the combinable modular subsystems; the at least one irradiating antenna puts any one of the combinable modular local units in communication with at least one reader/writer receiver of the Transponder RFID, external to the system, located near the at least one irradiating antenna;
a power source;
at least one computer in order to run software, supply the power, and transmit and receive information and commands;
at least one subsystem of communication, to transmit and receive the information and the commands;
the at least one microcontroller in order to acquire and send the information about address coordinates of any one of the combinable modular local units, to manage address programs, to supply the power to the combinable modular local units, and to manage the at least one subsystem of communication of the information received from the reader/writer receiver of the Transponder RFID;
at least one magnetic component contained in the combinable modular local units; and
a plurality of objects, each of the objects containing at least one of the Transponder RFID and a magnetic component.

2. The system of claim 1, further comprising:
at least one first diode in series to the antennas of the combinable modular local units with light-emitting semiconductors.

3. The system of claim 1, further comprising:
a reader/writer receiver of the Transponder RFID connected to the at least one subsystem of communication.

4. The system of claim 1, further comprising:
a subsystem comprising a plurality of proximity sensors, near each of the combinable modular local units, connected to another microcontroller, in turn connected to the at least one subsystem of communication.

* * * * *